(12) United States Patent
Takayanagi et al.

(10) Patent No.: US 7,695,174 B2
(45) Date of Patent: Apr. 13, 2010

(54) LIGHT-EMITTING DISPLAY DEVICE-EQUIPPED REAR-VIEW MIRROR

(75) Inventors: Shinya Takayanagi, Fujieda (JP); Masatoshi Nakamura, Fujieda (JP); Masahiro Motomiya, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 12/194,716

(22) Filed: Aug. 20, 2008

(65) Prior Publication Data

US 2009/0135493 A1  May 28, 2009

(30) Foreign Application Priority Data

Nov. 20, 2007  (JP)  ............... 2007-300380

(51) Int. Cl.
*B60R 1/08* (2006.01)
(52) U.S. Cl. ...................... 362/494; 359/609
(58) Field of Classification Search ................ 362/494, 362/135, 351; 135/265, 267, 601, 602, 608, 135/609; 359/265, 267, 601, 602, 608, 609
See application file for complete search history.

(56) References Cited

U.S. PATENT DOCUMENTS

| 7,042,616 | B2 * | 5/2006 | Tonar et al. | 359/265 |
| 7,274,501 | B2 * | 9/2007 | McCabe et al. | 359/265 |
| 7,471,438 | B2 * | 12/2008 | McCabe et al. | 359/265 |
| 7,490,943 | B2 * | 2/2009 | Kikuchi et al. | 359/507 |
| 2007/0058257 | A1 | 3/2007 | Lynam | |
| 2007/0080585 | A1 | 4/2007 | Lyu | |
| 2008/0212189 | A1 | 9/2008 | Baur et al. | |
| 2009/0080055 | A1 * | 3/2009 | Baur et al. | 359/267 |

FOREIGN PATENT DOCUMENTS

| JP | 2000-255321 | 9/2000 |
| JP | 2003-267129 | 9/2003 |

(Continued)

OTHER PUBLICATIONS

English language Abstract of JP 2000-255321, Sep. 19, 2000.

(Continued)

*Primary Examiner*—Thomas M Sember
(74) *Attorney, Agent, or Firm*—Greenblum & Bernstein P.L.C.

(57) ABSTRACT

Visibility of indications in a rear-view mirror incorporating a light-emitting display device is improved. A mirror element is formed by forming a semi-transmissive reflective film on one surface of a transparent substrate. On a back surface of the mirror element, a dark color mask member is arranged. An opening is formed in the mask member. Behind the mirror element, a light-emitting display device is arranged facing the opening. Where the mirror element is formed of a plane mirror, the light-emitting display device is arranged in such a manner that it is inclined toward a driver relative to the mirror surface. A wedge-shaped gap occurring between the mirror element and the light-emitting display device due to the inclination is occluded by a wall member. Where the mirror element is formed of a convex mirror, the opening is formed at a corner of the surface of the mirror element close to the driver, and the light-emitting display device is arranged facing an opening, with a display surface arranged in parallel to the surface of the mirror element 44.

12 Claims, 7 Drawing Sheets

FOREIGN PATENT DOCUMENTS

| | | |
|---|---|---|
| JP | 2005-316509 | 11/2005 |
| JP | 3846073 | 9/2006 |
| WO | 00/23826 | 4/2000 |
| WO | 2006/124682 | 11/2006 |

OTHER PUBLICATIONS

English language Abstract of JP 2000-159014, Jun. 13, 2000.
English language Abstract of JP 2005-316509, Nov. 10, 2005.
English language Abstract of JP 2003-267129, Sep. 25, 2003.

* cited by examiner

ORIENTATION OF CENTRAL AXIS OF MIRROR ELEMENT

ORIENTATION OF CENTRAL AXIS OF DISPLAY SURFACE

LIGHT-EMITTING DISPLAY DEVICE-EQUIPPED REAR-VIEW MIRROR

The disclosure of Japanese Patent Application No. JP2007-300380 filed on Nov. 20, 2007 including the specification, drawing and abstract is incorporated herein by reference in its entirety.

BACKGROUND OF THE INVENTION

1. Field of the Invention

The present invention relates to a rear-view mirror incorporating a light-emitting display device, and specifically relates to one with improved indication visibility.

2. Description of the Related Art

Japanese Patent Laid-Open No. 2000-255321, Japanese Patent No. 3846073, Japanese Patent Laid-Open No. 2005-316509, and Japanese Patent Laid-Open No. 2003-267129 each disclose a rear-view mirror that incorporates a light-emitting display device to display various kinds of information.

According to the rear-view mirror disclosed in each of Japanese Patent Laid-Open No. 2000-255321, Japanese Patent No. 3846073, Japanese Patent Laid-Open No. 2005-316509, and Japanese Patent Laid-Open No. 2003-267129, the orientation of the display surface of the light-emitting display device is set to be the same as the orientation of the mirror. Typically, a rear-view mirror is used with the mirror oriented outward relative to the direction toward the driver's viewpoint, and accordingly, when the orientation of the display surface of the light-emitting display device is set to be the same as the orientation of the mirror, the display surface is not oriented toward the driver, which results in poor visibility.

The present invention has been made in view of the aforementioned points, and aims to provide a light-emitting display device-equipped rear-view mirror with improved indication visibility.

SUMMARY OF THE INVENTION

The present invention comprises: a mirror element having a semi-transmissive reflective film on one surface of a transparent substrate; a mask member having an opening in a surface thereof, the mask member being arranged over an entire region excluding the opening, or at a relevant region excluding the opening, of a back side of the mirror element, at least a front surface of the mask member being of a dark color; and a light-emitting display device arranged at a position behind the mirror element, with a display surface facing the opening of the dark color mask member, wherein the orientation of a central axis of the display surface of the light-emitting display device is inclined toward a driver's viewpoint relative to the orientation of a central axis of the mirror element. According to the present invention, the orientation of the central axis of the display surface of the light-emitting display device is inclined toward the driver's viewpoint relative to the orientation of the central axis of the mirror element, making it easier for the driver to see indications. Also, since the reflective film is formed of a semi-transmissive reflective film, the display region can also function as a mirror when no indications are displayed (i.e., where the lights are off).

In the present invention, where the mirror element is formed of a plane mirror, it is possible that: the display surface of the light-emitting display device is arranged at the position of the opening in such a manner that it is inclined toward the driver's viewpoint relative to a surface of the mirror element; and a periphery of a wedge-shaped gap occurring between the mirror element and the light-emitting display device due to the inclination is occluded by a wall member, at least an inner surface of the wall member being of a dark color. This configuration makes it easier for the driver to see indications, and also to prevent the inside of the mirror device from being seen through from the wedge-shaped gap occurring between the mirror element and the light-emitting display device by occluding the gap with the wall member.

Also, in the present invention, where the mirror element is formed of a convex mirror, it is possible that: the opening is formed at a corner of a surface of the mirror element close to the driver's viewpoint; and the display surface of the light-emitting display device is arranged at the position of the opening, in parallel to the mirror surface (to be exact, in parallel to a tangent plane of the mirror element at a position where the central axis of the display surface crosses the surface of the mirror element). With this configuration, since the corner of the mirror element surface close to the driver's viewpoint is oriented somewhat toward the driver's viewpoint 32 compared to a plane mirror, arranging the light-emitting display device at that position in parallel to the mirror surface makes the display surface of the light-emitting display device oriented somewhat toward the driver compared to the case where a plane mirror is used, making it easier for the driver to see indications. In addition, a gap, like the aforementioned wedge-shaped gap, which is so large that it makes the inside be seen through, does not occur between the mirror element and the light-emitting display device, no wall member to occlude the wedge-shaped gap is required.

In the present invention, it is possible that the semi-transmissive reflective film is made of, for example, a dielectric multilayer film. Also, it is possible that a reflection peak wavelength of the mirror element in a visible light range is set to, for example, from 500 to 550 nm. As a result of setting the reflection characteristic as stated above, the reflected light intensity for both bluish short wavelength range light from a discharge lamp and reddish long wavelength range light from a halogen lamp can be reduced, making it possible to obtain a glare prevention effect during nighttime driving. The reflection color according to this reflection characteristic turns to be a greenish color, which is deemed to be eye-friendly, as a result of reduction of blue, which is highly irritating, making it possible to reduce stress given to the driver due to reflected light during daytime driving.

DETAILED DESCRIPTION OF THE PREFERRED EMBODIMENTS

Embodiment 1

Figure 1A:
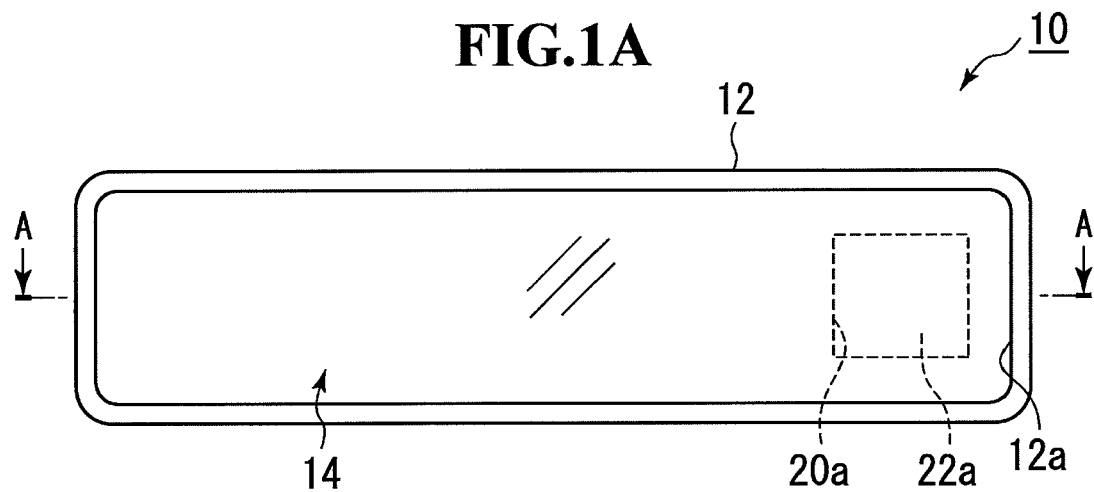
FIGS. 1A and 1B are a front view and a cross-sectional view of an embodiment of a vehicle inner mirror according to the present invention with a mirror element formed of a plane mirror.
Figure 1B:
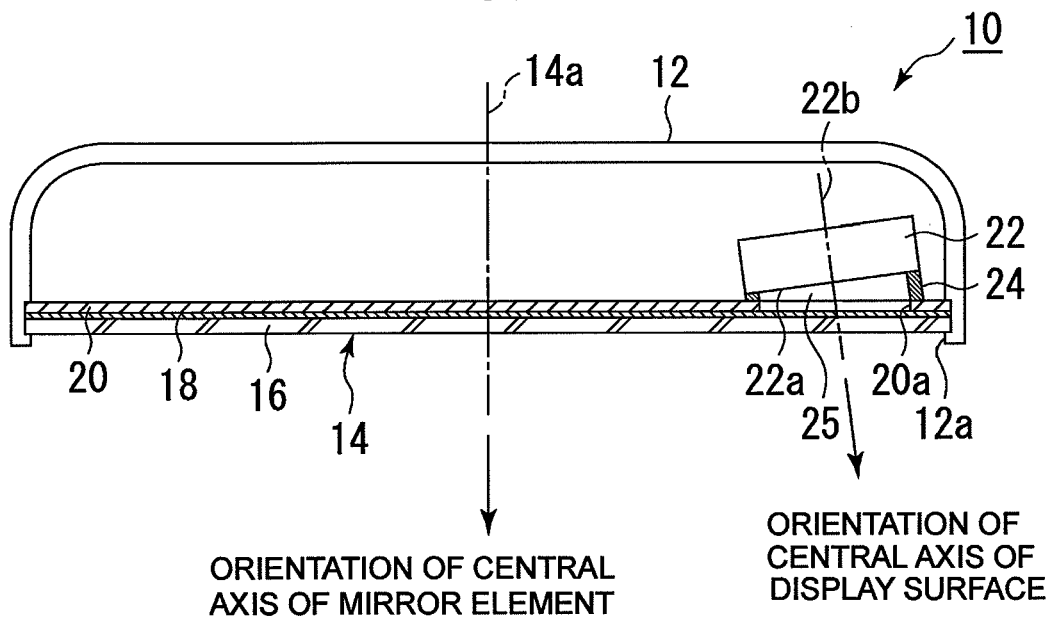

Embodiment 1 of the present invention will be described. FIGS. 1A and 1B illustrate an overview of the inner structure of a vehicle inner mirror to which the present invention has been applied. This embodiment has a mirror element formed of a plane mirror. FIG. 1A is a front view, and FIG. 1B is a cross-sectional view taken along a line indicated by arrows A-A in FIG. 1A. An inner mirror 10 is formed by putting a mirror element 14 into a front opening 12a of a housing 12. The mirror element 14 is formed to be a plane mirror having a semi-transmissive reflective film 18, which is formed of a dielectric multilayer film, on the back surface of a transparent substrate 16, such as flat plate-shaped glass. A dark color (for example, black) mask member 20 is attached to the back surface of the mirror element 14. An opening 20a is formed at the relevant region of the dark color mask member 20 (in FIGS. 1A and 1B, the right corner of the surface of the mirror element 14 close to a driver's viewpoint). The dark color mask member 20 is attached to the entire back surface of the mirror element 14 excluding the position of the opening 20a. The dark color mask member 20 is intended to prevent the inside of the housing 12 from being seen through from the outside, and can be formed of, for example, a resin plate, a resin film or a coating material, all of which are of dark colors (for example, black). Inside the housing 12, a light-emitting display device 22 is arranged at a position behind the mirror element 14, with a display surface 22a facing the opening 20a of the dark color mask member 20. The light-emitting display device 22 is formed of a liquid-crystal display device, an EL display device or the like. The light-emitting display device 22 is arranged with the central axis 22b of the display surface 22a inclined toward the driver's viewpoint relative to the central axis 14a of the mirror element 14. In order to provide this inclination, a wedge-shaped wall member 24 (see FIGS. 4A and 4B for details) is arranged between the mirror element 14 and the light-emitting display device 22. The wall member 24 is supported by being attached to the dark color mask member 20 (where the dark color mask member 20 is formed of a hard member such as a resin plate), or by being attached to a relevant part of the inside of the housing 12. The light-emitting display device 22 is supported by being attached to the dark color mask member 20 or supported by being attached to a relevant part of the inside of the housing 12.

Figure 2:
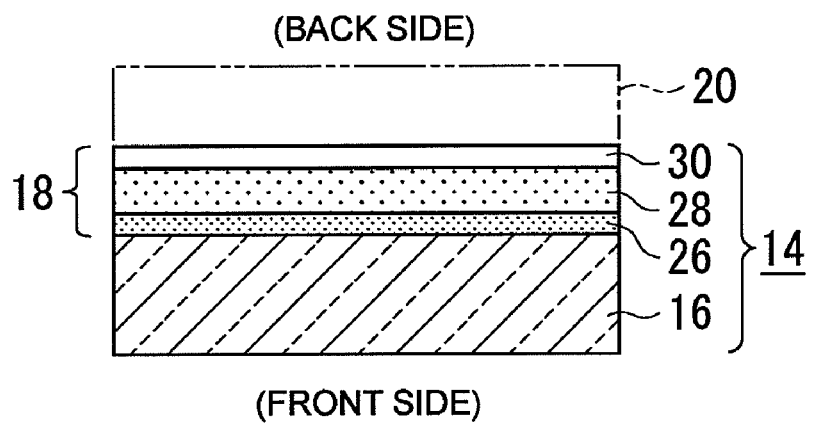
FIG. 2 is a cross-sectional view schematically illustrating a film configuration of a semi-transmissive reflective film 18 shown in FIGS. 1A and 1B.
Figure 3:
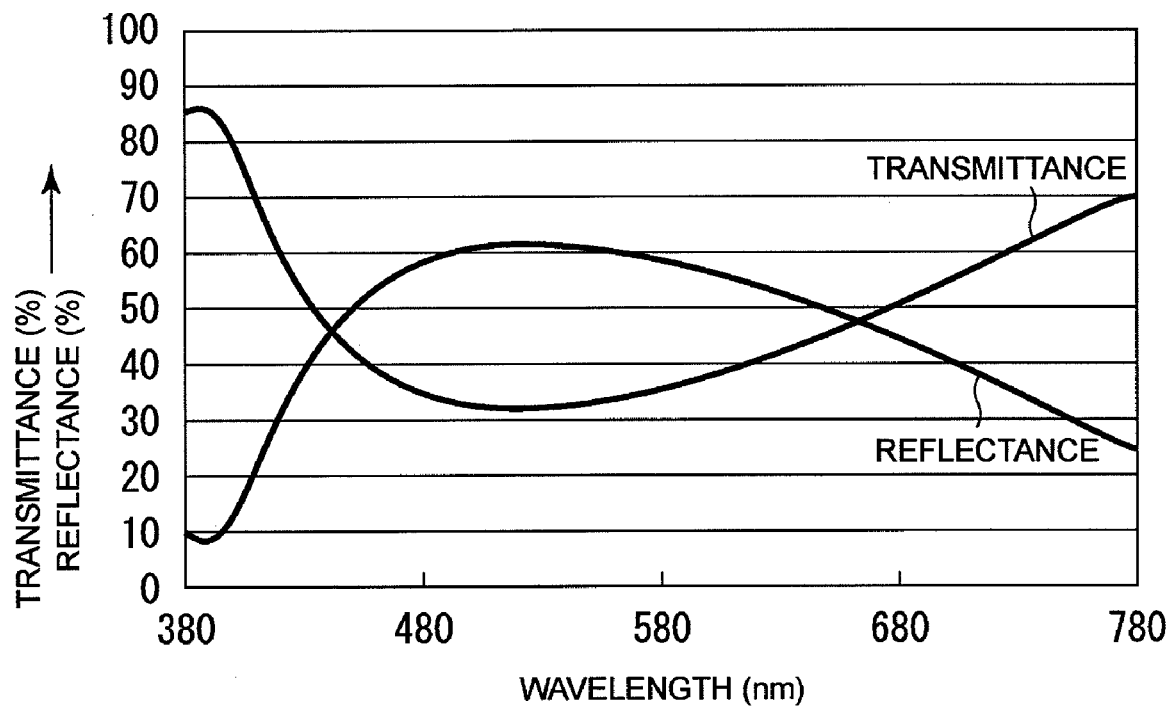
FIG. 3 is a graph indicating the reflectance characteristics and the transmittance characteristics of a mirror element shown in FIG. 2 where each of high refractive index material films 26 and 30 is formed of $TiO_2$ and a low refractive index material film 28 is formed of $SiO_2$.

FIG. 2 schematically illustrates the film configuration of the semi-transmissive reflective film 18. The transparent substrate 16 is formed of, for example, soda lime glass. On the back surface of the transparent substrate 16, the semi-transmissive reflective film 18 is formed. The semi-transmissive reflective film 18 is formed of a dielectric multilayer film obtained by sequentially depositing three films, i.e., a high refractive index material film 26, a low refractive index material film 28 and a high refractive index material film 30, on the back surface of the transparent substrate 16. Each of the layers 26, 28 and 30 is formed of a material that absorbs no visible light or absorbs an extremely small amount of visible light. The optical film thickness of each of the films 26, 28 and 30 is $\lambda/4$ ($\lambda$: reference wavelength). The reflection peak wavelength of the mirror element 14 in the visible light range is set to from 500 to 550 nm. FIG. 3 shows an example of the reflectance characteristics and the transmittance characteristics of the mirror element 14 shown in FIG. 2 where the high refractive index material films 26 and 30 are each formed of $TiO_2$ and the low refractive index material film 28 is formed of $SiO_2$. The characteristics exhibit a single reflection peak in the visible light range. According to the characteristics, the reflectance necessary for a vehicle mirror can be obtained. Also, the reflection peak wavelength in the visible light range is approximately 530 nm, and the reflectance for that wavelength is approximately 60%. Accordingly, glare that a cold mirror may give will not be given to drivers. Also, since the reflectance gently decreases at both sides of the reflection peak wavelength, it is possible to reduce the reflected light intensity for both bluish short-wavelength range light from a discharge lamp and reddish long wavelength range light from a halogen lamp, making it possible to obtain a higher glare prevention effect. Also, where the high refractive index material films of the semi-transmissive reflective film 18 are formed of $TiO_2$ and the low refractive index material film is formed of $SiO_2$, the integrating sphere reflectance in the visible light range becomes overly high if five or more layers are deposited, resulting in that headlight from behind makes a driver have the feeling of glare at night. Furthermore, as the number of layers increases, the spectral shape of the reflected light sharply changes, and as a result, problems arise, for example, in that the mirror element 14 provides no natural tone and becomes unsuitable for a mirror, and moreover, and that its view angle dependency increases, causing a discontinuous part in the tone of reflected light. Therefore, three or four layers are suitable for the laminated layers of the semi-transmissive reflective film 18.

Figure 4A:
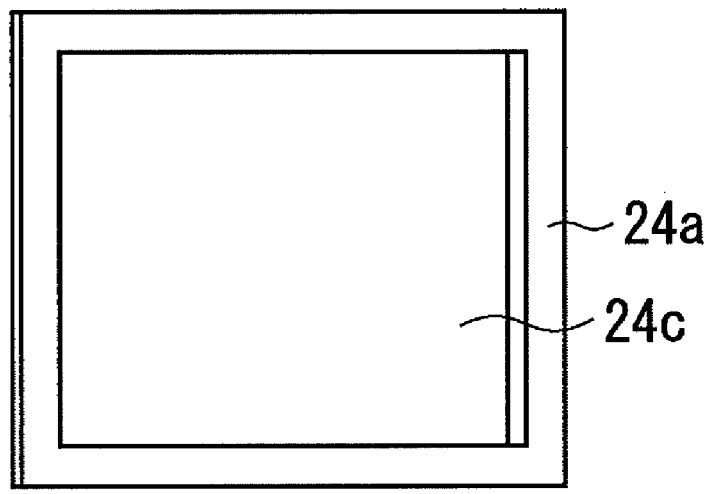
FIGS. 4A and 4B are a front view and a plan view illustrating a structure of a wall member 24 shown in FIGS. 1A and 1B.
Figure 4B:
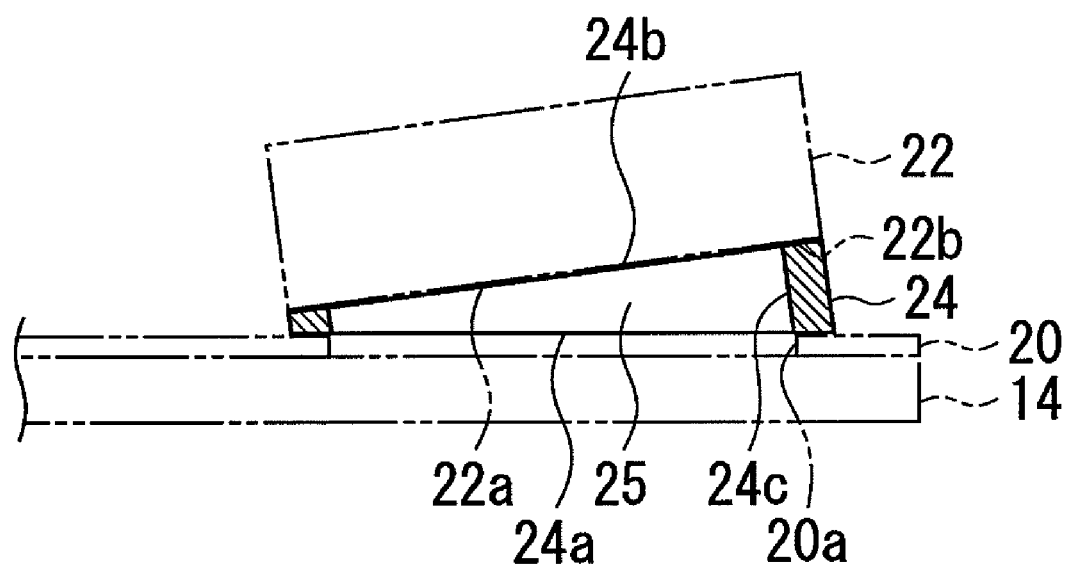

FIGS. 4A and 4B show the structure of the wall member 24. FIG. 4A is a front view and FIG. 4B is a plan view. The entire wall member 24 is formed of, for example, plastic of a dark color (for example, black). The wall member 24 has a front shape formed into a rectangular frame shape conforming to the shape of the opening 20a of the dark color mask member 20 (the shape of the display surface 22a of the light-emitting display device 22), and a plan shape formed into a wedge shape. The front end surface 24a of the wall member 24 adheres to (for example, it is bonded to) the position in the back surface of the dark color mask member 20 surrounding the opening 20a, and the rear end surface 24b adheres to (for example, it is bonded to) the front end surface peripheral edge 22b of the light-emitting display device 22. By means of this wall member 24, a wedge-shaped gap 25 between the mirror element 14 and the light-emitting display device 22 is occluded. Accordingly, even when the inner surface of the housing 12 is not of black, it is possible to prevent the inside of the inner mirror 10 from being seen through from the gap 25. Also, it is possible to prevent the wirings in the housing 12 from being seen through. The dark color mask member 20 and the wall member 24 can also be formed as an integrally-molded product of dark color (for example, black) plastic. Information, such as characters and images, displayed on the display surface 22a of the light-emitting display device 22 is guided to the driver s viewpoint by passing through an opening 24c of the wall member 24 and the opening 20a of the dark color mask member 20 and penetrating the mirror element 14. When no indications are displayed in the light-emitting display device 22 (when lights are off), the entire mirror element 14 functions as a mirror, which contributes to safe driving and also provides a good design because no noticeable discontinuities occur in the entire mirror element 14.

Figure 5A:
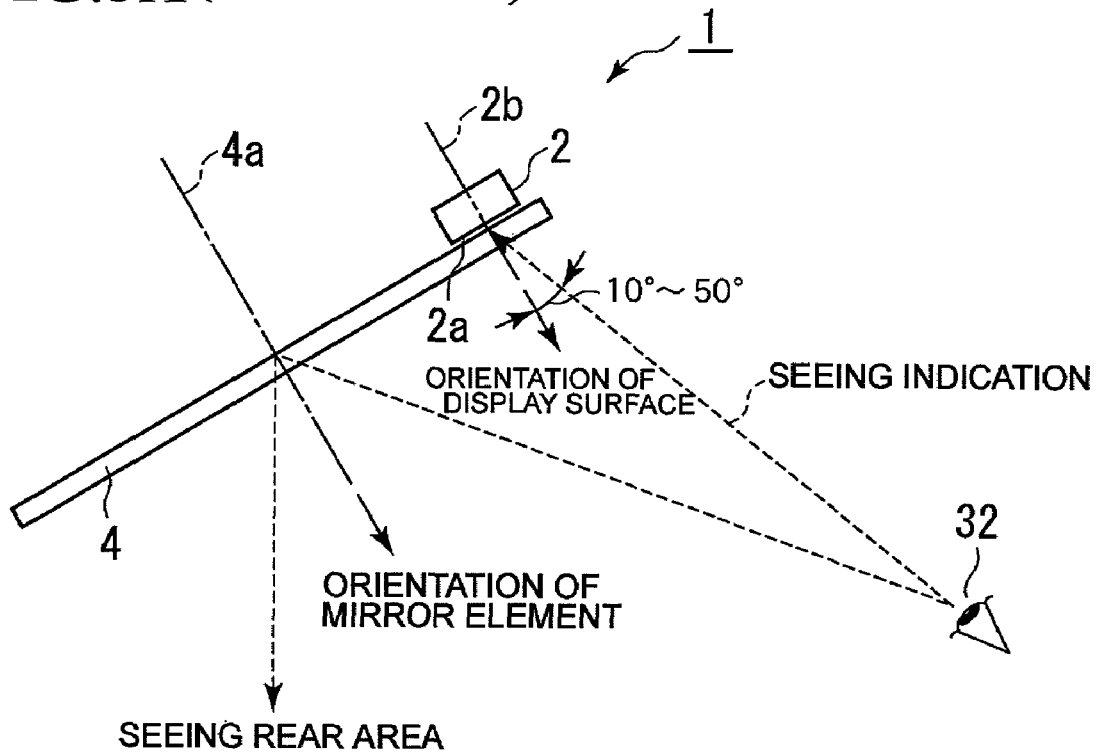
FIGS. 5A and 5B are plan views indicating a difference in operation between a conventional display device-equipped inner mirror 1 and the display device-equipped inner mirror 10 shown in FIGS. 1A and 1B.
Figure 5B:
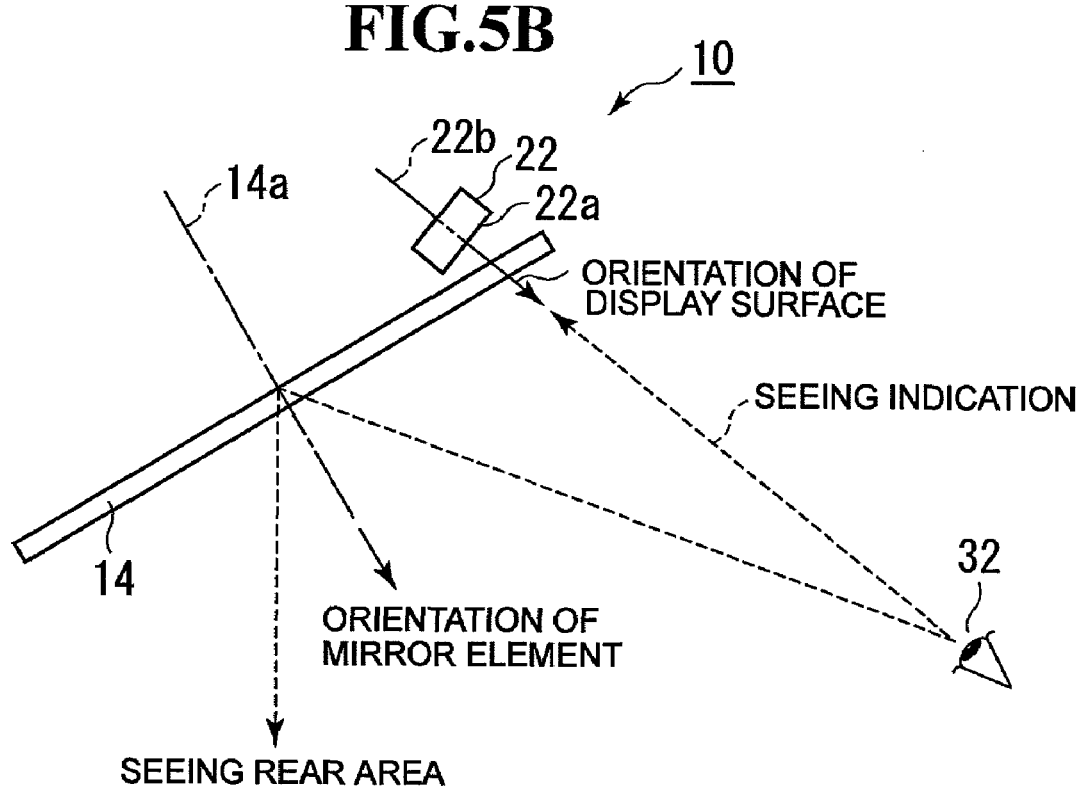

FIGS. 5A and 5B show a difference in operation between a conventional display device-equipped inner mirror 1 and the display device-equipped inner mirror 10 shown FIGS. 1A and 1B. In the conventional display device-equipped inner mirror 1 shown in FIG. 5A, the orientation of the central axis 4a of a mirror element 4 and the orientation of the central axis 2b of a display surface 2a of a light-emitting display device 2 are in parallel to each other. Typically, the mirror element 4 of the inner mirror is used with the central axis 4a oriented outward relative to the direction toward a driver's viewpoint 32, and accordingly, the light-emitting display device 2 is also used with the central axis 2b of the display surface 2a oriented outward relative to the direction toward the driver's viewpoint 32. As a result, the orientation of the central axis 2b of the display surface 2a of the light-emitting display device 2 substantially deviates outward from the direction toward the driver's viewpoint 32 (the deviation angle is approximately 10° to 50°), which makes it difficult for the driver to see indications on the light-emitting display device 2. In particular, where the light-emitting display device 2 is a liquid-crystal display device, it is further difficult to see indications because it has view angle dependency. Meanwhile, according to the display device-equipped inner mirror 10 shown in FIGS. 1A and 1B, which is shown in FIG. 5B, the light-emitting display device 22 is oriented toward the driver's viewpoint 32 (i.e., the display surface 22a becomes close to be perpendicular to the line of sight from the driver's viewpoint 32) and as a result, the driver can easily see indications on the light-emitting display device 22.

Embodiment 2

Figure 6A:
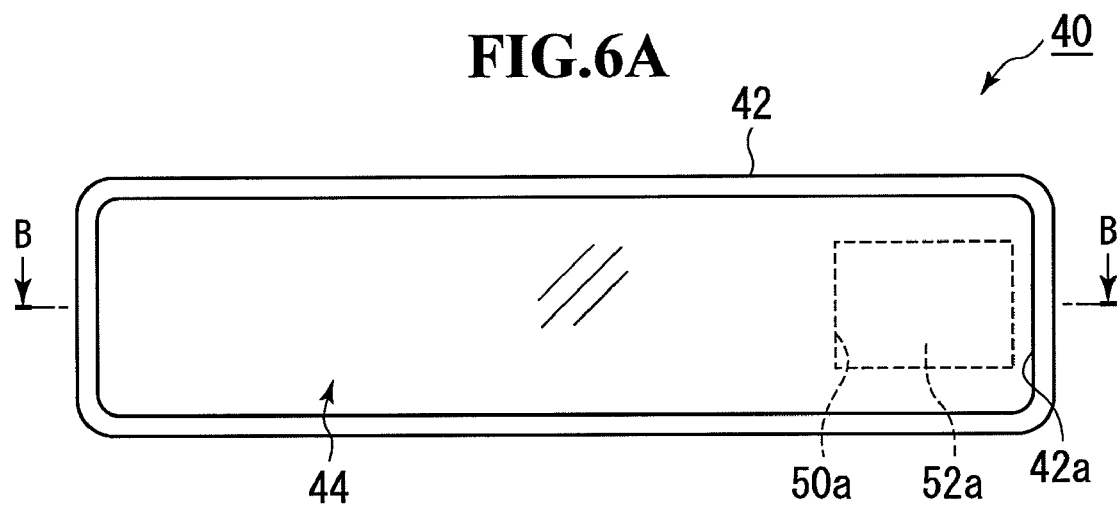
FIGS. 6A and 6B are a front view and a cross-sectional view of an embodiment of a vehicle inner mirror according to the present invention with a mirror element formed of a convex mirror.
Figure 6B:
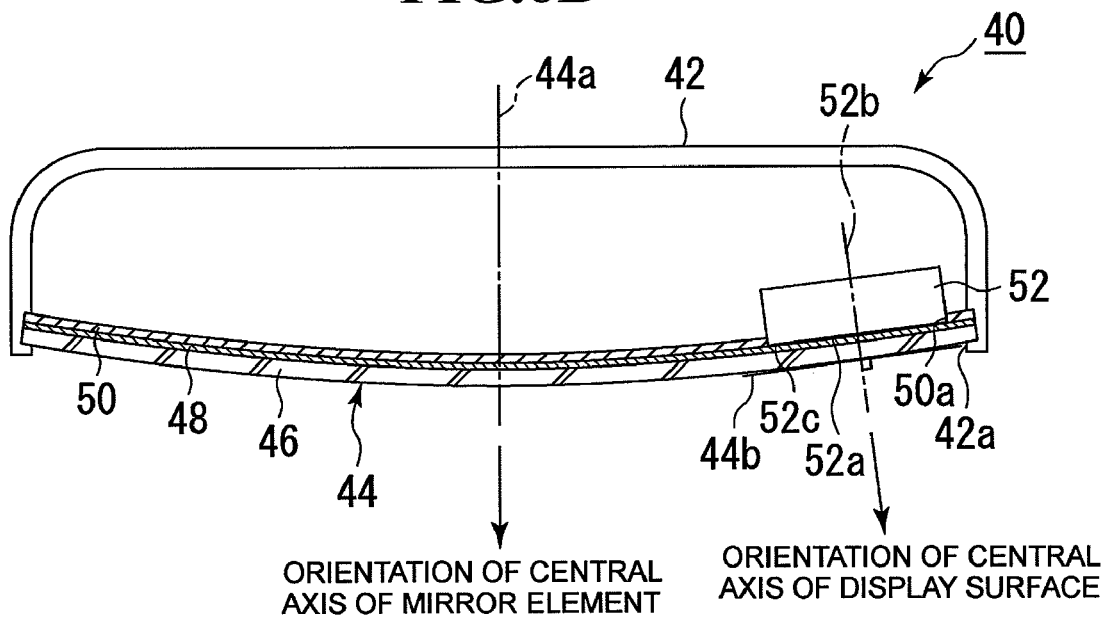

Embodiment 2 of the present invention will be described. FIGS. 6A and 6B illustrate an overview of the inner structure of a vehicle inner mirror to which the present invention has been applied. This embodiment has a mirror element formed of a convex mirror. FIG. 6A is a front view, and FIG. 6B is a cross-sectional view taken along a line indicated by arrows B-B in FIG. 6A. An inner mirror 40 is formed by putting a mirror element 44 into a front opening 42a of a housing 42. The mirror element 44 is formed to be a convex mirror having a semi-transmissive reflective film 48, which is formed of a dielectric multilayer film, on the back surface of a transparent substrate 46 such as curved glass. The semi-transmissive reflective film 48 can have the film configuration that is similar to that shown in FIG. 2 and can also have the reflectance characteristics and transmittance characteristics that are similar to those shown in FIG. 3. The curvature radius of the curve can be set to, for example, 1800 mm. A dark color (for example, black) mask member 50 is attached to the back surface of the mirror element 44 along the curve. An opening 50a is formed in the right corner region of the dark color mask member 50 close to the driver's viewpoint. The dark color mask member 50 is attached to the entire back surface of the mirror element 44 excluding the position of the opening 50a. The dark color mask member 50 is intended to prevent the inside of the housing 42 from being seen through from the outside, and can be formed of, for example, a resin plate, a resin film or a coating material, all of which are of dark colors (for example, black). Inside the housing 42, a light-emitting display device 52 is arranged at a position behind the mirror element 44, with a display surface 52a facing the opening 50a of the dark color mask member 50. The light-emitting display device 52 is formed of a liquid-crystal display device, an EL display device or the like. The display surface 52a of the light-emitting display device 52 is arranged at the position of the opening 50a, in parallel to the surface of the mirror element 44 (to be exact, the display surface 52a is in parallel to the tangent plane 44b of the mirror element 44 at the position where the central axis 52b of the display surface 52a crosses the surface of the mirror element 44). Consequently, the light-emitting display device 52 is arranged with the central axis 52b of the display surface 52a inclined toward the driver's viewpoint relative to the central axis 44a of the mirror element 44. The front end surface 52c of the light-emitting display device 52 is held in such a manner that it is housed in the opening 50a of the dark color mask member 50. Alternatively, the peripheral edge of the front end surface 52c of the light-emitting display device 52 is held in such a manner that it adheres to the position in the back surface of the dark color mask member 50 surrounding the opening 50a. As a result, the opening 50a of the dark color mask member 50 is occluded by the front end surface 52c of the light-emitting display device 52. Since the surface of the mirror element 44 is curved, where the display surface 52a of the light-emitting display device 52 is flat, a minute gap occurs partially between the display surface 52a and the back surface of the mirror element 44 even though the display surface 52a is made to touch the back surface (concave surface) of the mirror element 44. However, this gap is not so large as to allow the inside of the inner mirror 40 to be seen through, and accordingly, it eliminates the need for a wall member like one to occlude a wedge-shaped gap as used in embodiment 1. The light-emitting display device 52 is supported by being attached to the dark color mask member 50 (where the dark color mask member 50 is formed of a hard member such as a resin plate) or supported by being attached to a relevant position in the inside of the housing 42.

With the aforementioned configuration, information, such as characters and images, displayed on the display surface 52a of the light-emitting display device 52 is guided to the driver's viewpoint by passing through the opening 50a of the dark color mask member 50 and penetrating the mirror element 44. When no indications are displayed on the light-emitting display device 52 (when lights are off), the entire mirror element 44 functions as a mirror.

Figure 7A:
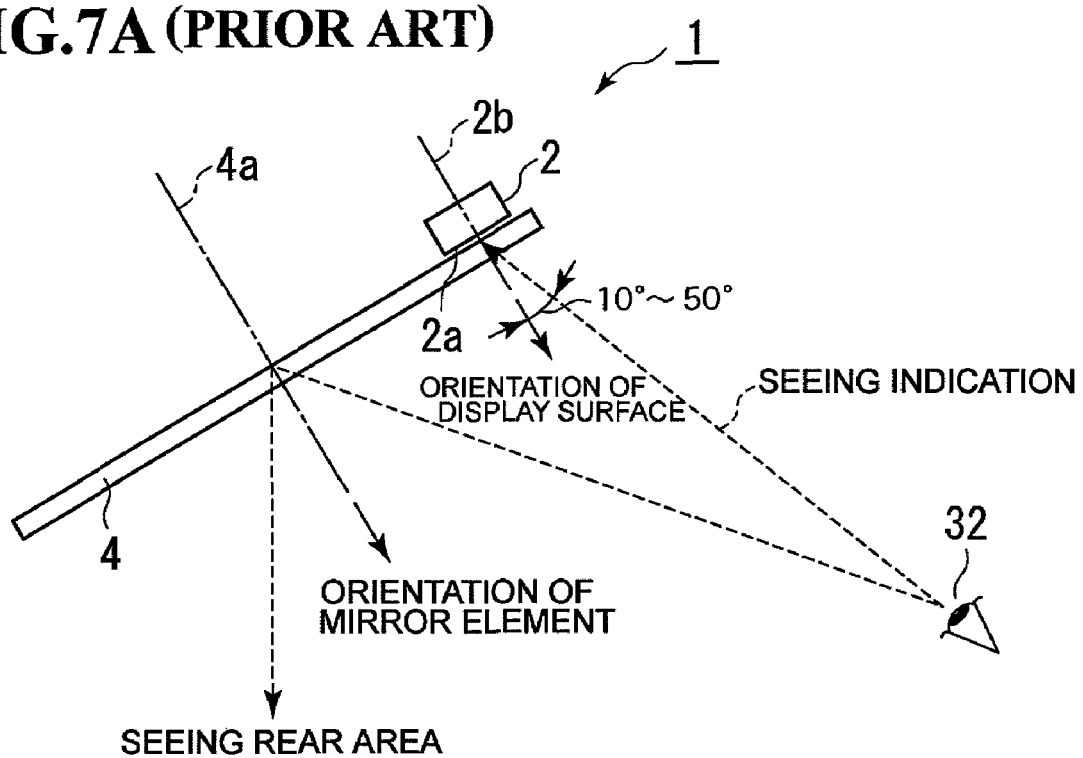
FIGS. 7A and 7B are plan views indicating a difference in operation between a conventional display device-equipped inner mirror 1 and the display device-equipped inner mirror 40 shown in FIGS. 6A and 6B.
Figure 7B:
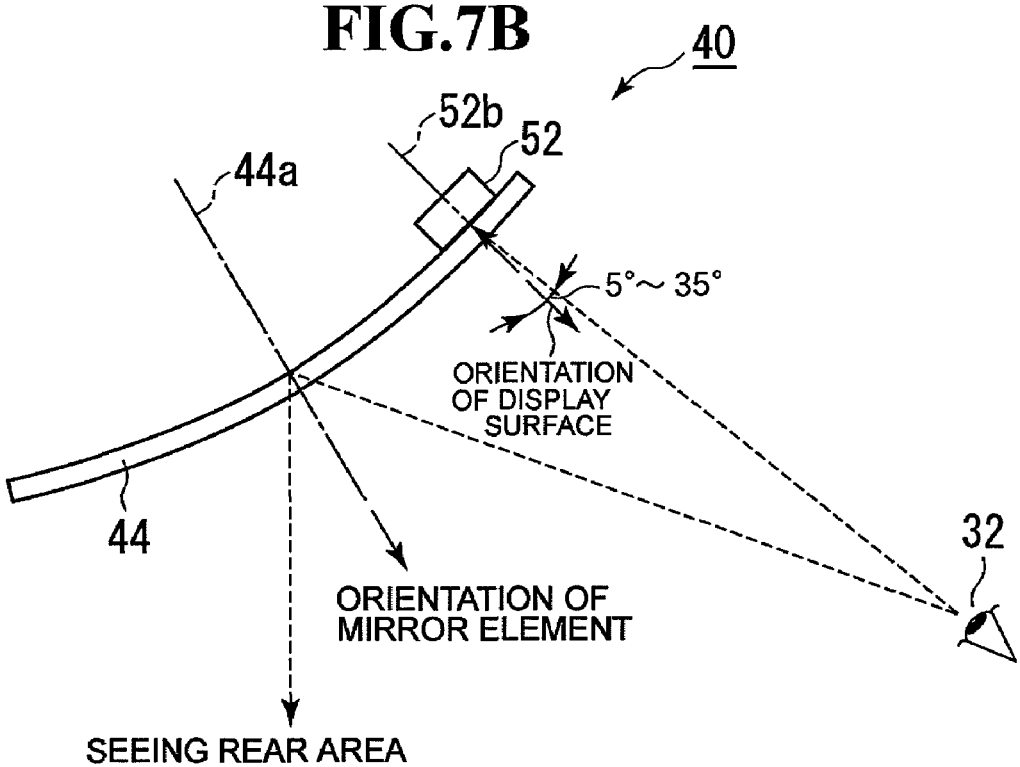

FIGS. 7A and 7B show a difference in operation between a conventional display device-equipped inner mirror 1 (FIG. 7A shows the same one as shown in FIG. 5A) and the display device-equipped inner mirror 40 shown in FIGS. 6A and 6B. In the conventional display device-equipped inner mirror 1 shown in FIG. 7A, the orientation of the central axis 4a of a mirror element 4 and the orientation of the central axis 2b of a display surface 2a of a light-emitting display device 2 are in parallel to each other. Typically, the mirror element 4 of the inner mirror is used with the central axis 4a oriented outward relative to the direction toward a driver's viewpoint 32, and accordingly, the light-emitting display device 2 is also used with the central axis 2b of the display surface 2a oriented outward relative to the direction toward the driver's viewpoint 32. As a result, the orientation of the central axis 2b of the display surface 2a of the light-emitting display device 2 substantially deviates outward from the direction toward the driver's viewpoint 32 (the deviation angle is approximately 10° to 50°), which makes it difficult for the driver to see indications on the light-emitting display device 2. In particular, where the light-emitting display device 2 is a liquid-crystal display device, it is further difficult to see indications because it has view angle dependency. Meanwhile, according to the display device-equipped inner mirror 40 shown in FIGS. 6A and 6B, which is shown in FIG. 7B, the light-emitting display device 52 is arranged in a region of the right corner of the curved surface of the mirror element 44, which is somewhat oriented toward the driver's viewpoint 32, with the display surface 52a arranged along the surface of the mirror element 44, and as a result, the angle of deviation of the orientation of the central axis 52b of the light-emitting display device 52 from the direction toward the driver's viewpoint 32 is approximately 5° to 35° (where the curvature radius of the curve is 1800 mm), the deviation angle is reduced by approximately 5° to 15° compared to the conventional device shown in FIG. 7A. As a result, the display surface 52a becomes close to be perpendicular to the line of sight from the driver's viewpoint 32, which makes it easier for the driver to see indications on the light-emitting display device 52.

Figure 8:
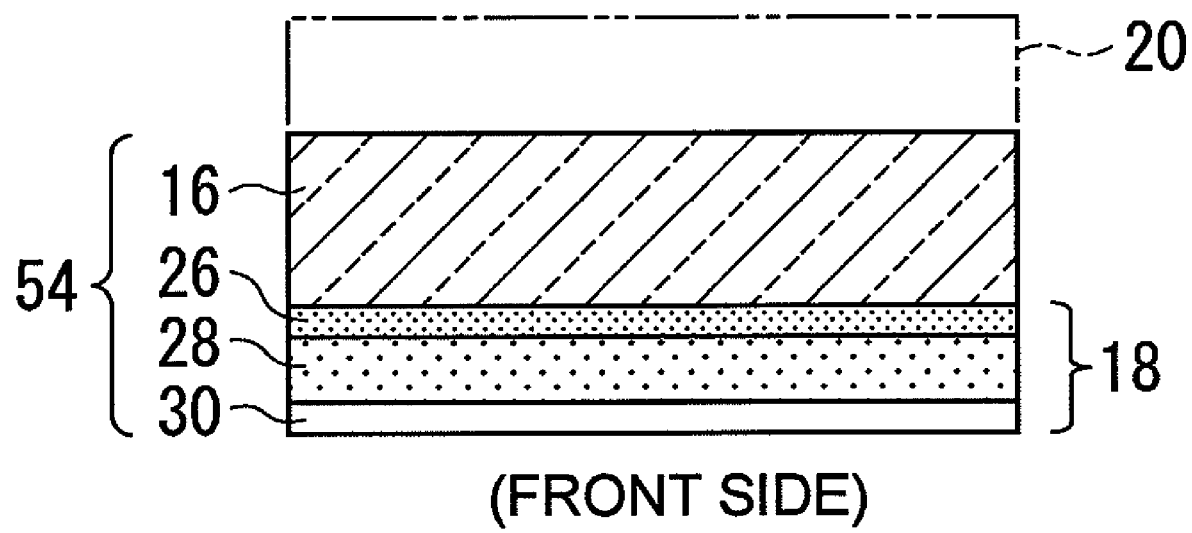
FIG. 8 is a cross-sectional view schematically illustrating a film configuration of a semi-transmissive reflective mirror where a mirror element is formed of a front surface mirror in the vehicle inner mirror shown in FIGS. 1A and 1B/FIGS. 6A and 6B.

In the aforementioned embodiments, the mirror element is formed to be a back-surface mirror having a reflective film formed on the back side of a mirror substrate, but it may also be formed to be a front-surface mirror with a reflective film formed on the front side of the mirror substrate. FIG. 8 illustrates an example configuration of a front-surface mirror. The parts in common to those in FIG. 2 are provided with the same reference numerals. On the front surface of a transparent substrate 16, a semi-transmissive reflective film 18 is formed. The semi-transmissive reflective film 18 is formed of a dielectric multilayer film obtained by sequentially depositing three films, i.e., a high refractive index material film 26, a low refractive index material film 28 and a high refractive index material film 30, on the front surface of the transparent substrate 16. Each of the layers 26, 28 and 30 is formed of a material that absorbs no visible light or absorbs an extremely small amount of visible light. The optical film thickness of each of the films 26, 28 and 30 is λ/4 (λ: reference wavelength). The reflection peak wavelength in the visible light range of the mirror element 54 is set to from 500 to 550 nm. The reflectance characteristics and the transmittance characteristics of the mirror element 54 shown in FIG. 8 where the high refractive index material films 26 and 30 are each formed of $TiO_2$ and the low refractive index material film 28 is formed of $SiO_2$ are, for example, similar to those shown in FIG. 3. For the laminated layers of the semi-transmissive reflective film 18 where the high refractive index material films of the semi-transmissive reflective film 18 is formed of $TiO_2$ and the low refractive index material film is formed of $SiO_2$, three or four layers are suitable. A dark color (for example, black) mask member 20 is attached to the back surface of the transparent substrate 16.

What is claimed is:

1. A light-emitting display device-equipped rear-view mirror, comprising:

a mirror element having a semi-transmissive reflective film on one surface of a transparent substrate;

a mask member having an opening in a surface thereof, the mask member being arranged over an entire region excluding the opening, or at a relevant region excluding the opening, of a back side of the mirror element, at least a front surface of the mask member being of a dark color; and a light-emitting display device arranged at a position behind the mirror element, with a display surface facing the opening of the dark color mask member, wherein the orientation of a central axis of the display surface of the light-emitting display device is inclined toward a driver's viewpoint relative to the orientation of a central axis of the mirror element.

2. The light-emitting display device-equipped rear-view mirror according to claim 1, wherein:

the mirror element is a plane mirror;

the display surface of the light-emitting display device is arranged at the position of the opening in such a manner that it is inclined toward the driver's viewpoint relative to a surface of the mirror element; and a periphery of a wedge-shaped gap occurring between the mirror element and the light-emitting display device due to the inclination is occluded by a wall member, at least an inner surface of the wall member being of a dark color.

3. The light-emitting display device-equipped rear-view mirror according to claim 2, wherein the semi-transmissive reflective film is made of a dielectric multilayer film.

4. The light-emitting display device-equipped rear-view mirror according to claim 2, wherein a reflection peak wavelength of the mirror element in a visible light range is set to from 500 to 550 nm.

5. The light-emitting display device-equipped rear-view mirror according to claim 3, wherein a reflection peak wavelength of the mirror element in a visible light range is set to from 500 to 550 nm.

6. The light-emitting display device-equipped rear-view mirror according to claim 1, wherein the semi-transmissive reflective film is made of a dielectric multilayer film.

7. The light-emitting display device-equipped rear-view mirror according to claim 6, wherein a reflection peak wavelength of the mirror element in a visible light range is set to from 500 to 550 nm.

8. The light-emitting display device-equipped rear-view mirror according to claim 1, wherein a reflection peak wavelength of the mirror element in a visible light range is set to from 500 to 550 nm.

9. A light-emitting display device-equipped rear-view mirror, comprising:

a mirror element having a semi-transmissive reflective film on one surface of a transparent substrate;

a mask member having an opening in a surface thereof, the mask member being arranged over an entire region excluding the opening, or at a relevant region excluding the opening, of a back side of the mirror element, at least a front surface of the mask member being of a dark color; and a light-emitting display device arranged at a position behind the mirror element, with a display surface facing the opening of the dark color mask member, wherein the orientation of a central axis of the display surface of the light-emitting display device is inclined toward a driver's viewpoint relative to the orientation of a central axis of the mirror element wherein the mirror element is a convex mirror;

the opening is formed at a corner of a surface of the mirror element close to the driver's viewpoint; and the display surface of the light-emitting display device is arranged at the position of the opening, in parallel to a tangent plane of the mirror element at a position where the central axis of the display surface crosses the surface of the mirror element.

10. The light-emitting display device-equipped rear-view mirror according to claim 9, wherein the semi-transmissive reflective film is made of a dielectric multilayer film.

11. The light-emitting display device-equipped rear-view mirror according to claim 10, wherein a reflection peak wavelength of the mirror element in a visible light range is set to from 500 to 550 nm.

12. The light-emitting display device-equipped rear-view mirror according to claim 9, wherein a reflection peak wavelength of the mirror element in a visible light range is set to from 500 to 550 nm.

* * * * *